United States Patent
Adhikari et al.

(10) Patent No.: US 12,430,775 B2
(45) Date of Patent: Sep. 30, 2025

(54) METHOD AND ELECTRONIC DEVICE FOR TRACKING REGIONS OF INTEREST IN IMAGE FRAMES

(71) Applicant: SAMSUNG ELECTRONICS CO., LTD., Suwon-si (KR)

(72) Inventors: Soumyadarshi Adhikari, Karnataka (IN); Harisha Huliyar Shivalingamurthy, Karnataka (IN); Bikash Agrawal, Karnataka (IN); Ashish Kumar Singh, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 504 days.

(21) Appl. No.: 17/830,694

(22) Filed: Jun. 2, 2022

(65) Prior Publication Data
US 2022/0398749 A1 Dec. 15, 2022

(30) Foreign Application Priority Data

Jun. 14, 2021 (IN) .............................. 202141026445
Jan. 27, 2022 (IN) .............................. 202141026445

(51) Int. Cl.
*G06T 7/246* (2017.01)
*G06T 3/40* (2006.01)
(Continued)

(52) U.S. Cl.
CPC ............... *G06T 7/248* (2017.01); *G06T 3/40* (2013.01); *G06T 7/254* (2017.01); *G06T 7/70* (2017.01); *G06T 2207/20224* (2013.01)

(58) Field of Classification Search
CPC G06T 7/248; G06T 3/40; G06T 7/254; G06T 7/70; G06T 2207/20224
See application file for complete search history.

(56) References Cited

U.S. PATENT DOCUMENTS 7,907,750 B2 3/2011 Ariyur et al.
8,085,302 B2 * 12/2011 Zhang .................... H04N 7/188
348/169

(Continued)

FOREIGN PATENT DOCUMENTS

CN 110728700 1/2020

OTHER PUBLICATIONS

Examination Report dated Jan. 13, 2023 issued by the Indian Patent Office for Indian Patent Application No. 202141026445, 6 pages.

(Continued)

*Primary Examiner* — John Villecco
*Assistant Examiner* — Kyla Guan-Ping Tiao Allen
(74) *Attorney, Agent, or Firm* — Nixon & Vanderhye, P.C.

(57) ABSTRACT

Embodiments herein provide a method for tracking a ROI in image frames using an electronic device (100). The method includes receiving the image frames from one or more cameras (150) of the electronic device (100). The method includes identifying the ROI in the image frames to be tracked. The method includes determining a distance of the ROI from each edge of the image frames. The method includes recognizing that the ROI is moving away from a position in the image frames based on the distance of the ROI from each edge of the image frames. The method includes automatically operating an actuator (151) of the one or more cameras (150) to vary the distance of the ROI from each edge of the image frames to maintain the position of the ROI in the image frames.

6 Claims, 10 Drawing Sheets

(51) Int. Cl.
*G06T 7/254* (2017.01)
*G06T 7/70* (2017.01)

(56) References Cited

U.S. PATENT DOCUMENTS

| | | | |
|---|---|---|---|
| 10,048,367 B2 * | 8/2018 | Meredith | G01S 13/867 |
| 2011/0090341 A1 | 4/2011 | Ikewada et al. | |
| 2012/0093361 A1 | 4/2012 | Huang et al. | |
| 2017/0019605 A1 | 1/2017 | Ahiska | |
| 2017/0053167 A1 * | 2/2017 | Ren | G06T 7/246 |
| 2017/0094184 A1 * | 3/2017 | Gao | G06T 7/337 |

OTHER PUBLICATIONS

Khiem et al., "Supporting Zoomable Video Streams with Dynamic Region-of-Interest Cropping", MMSys'10, Feb. 22-23, 2010, pp. 259-270.

Hearing Notice dated Oct. 17, 2014 in Indian Patent Application No. 202141026445 and English-language translation.

\* cited by examiner

METHOD AND ELECTRONIC DEVICE FOR TRACKING REGIONS OF INTEREST IN IMAGE FRAMES

CROSS-REFERENCE TO RELATED APPLICATIONS

This application is based on and claims priority under 35 U.S.C. § 119 to Indian Provisional Application No. 202141026445, filed on Jun. 14, 2021, and Indian Complete Application No. 202141026445, filed on Jan. 27, 2022, in the Indian Patent Office, the disclosures of which are incorporated by reference herein in their entireties.

BACKGROUND

1. Field

The disclosure relates to imaging techniques, and for example, to a method and an electronic device for tracking Region of Interests (ROIs) in image frames.

2. Description of Related Art

Figure 1A:
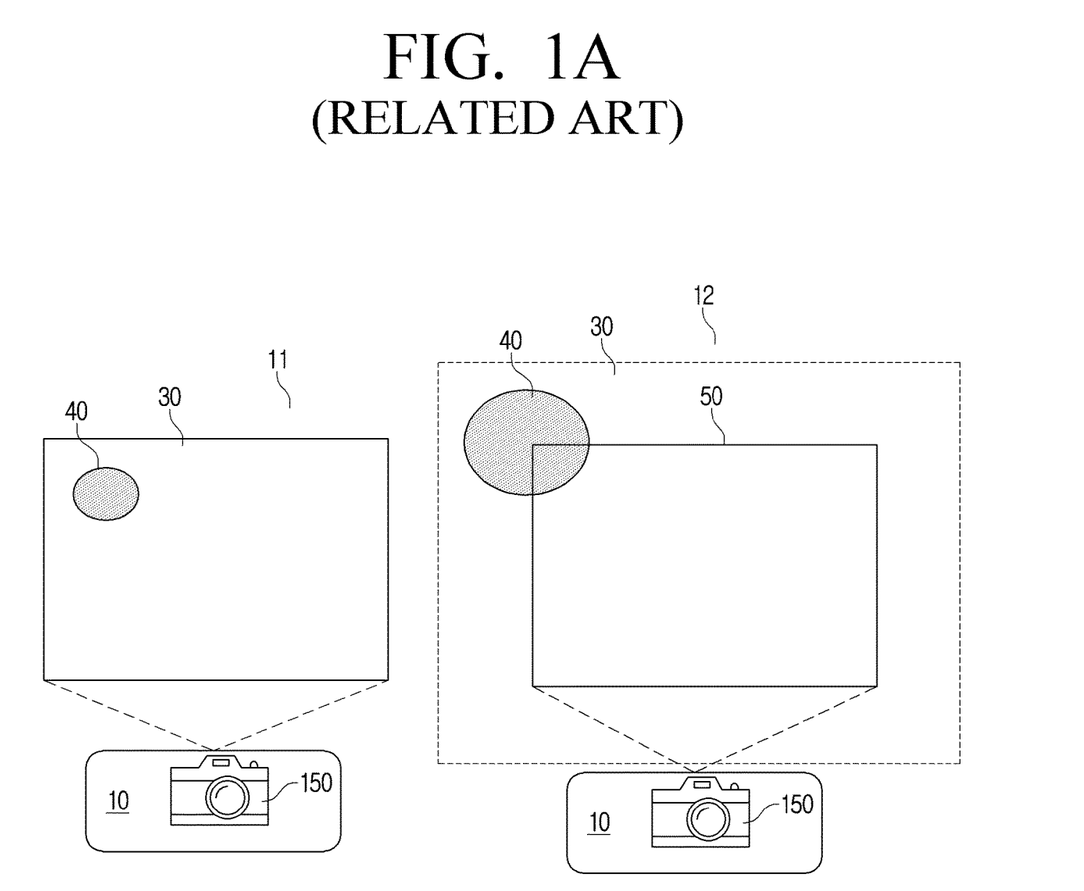
FIGS. 1A and 1B are diagrams illustrating example scenarios of capturing image frames of a scene using a conventional electronic device, according to the prior art.

A user generally zooms in a scene or moves closer to the scene using a camera (150) of an electronic device (10) to capture an enlarged view of the scene. Consider, the electronic device (10) is capturing images frames (30) of a scene using the camera (150) as shown in (11) of FIG. 1A. The scene includes an object (40) located at a corner of the scene, where the object (40) is a Region of Interest (ROI) in the images frames (30). As shown in (12) of the FIG. 1A, when the user zooms the scene using the camera (150), the camera (150) captures the object (40) partially or completely misses to capture the object (40) in subsequent image frames (50) as a digital/optical zoom of the camera (150) is generally focused on a centre of the scene.

Figure 1B:
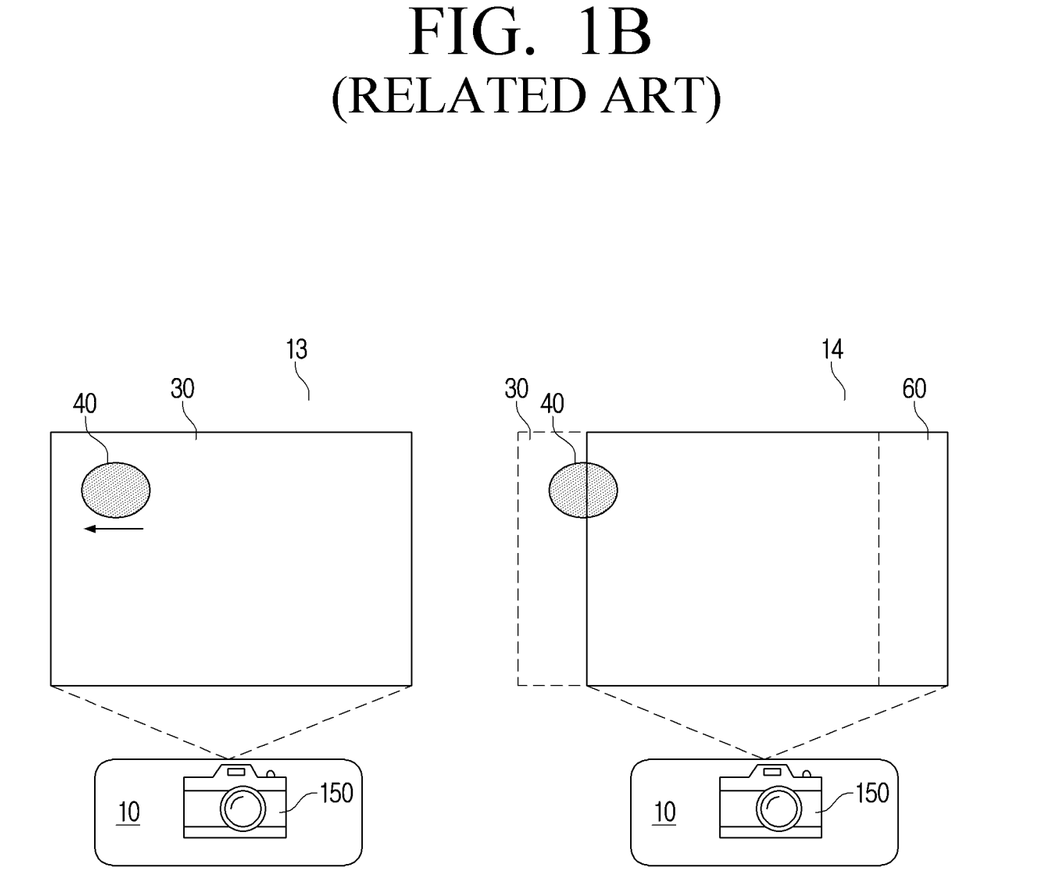

Consider, the electronic device (10) is capturing the images frames (30) of the scene using the camera (150) as shown in (13) of FIG. 1. The scene includes the object (40) located at the corner of the scene and moving outwards the scene, where the object (40) is the ROI in the images frames (30). For capturing the ROI in subsequent image frames (60), the user has to track a motion of the ROI and manually change an orientation of the electronic device (10), which will be a hectic task for the user. Moreover, if the object belongs to the ROI suddenly changes a speed or/and a direction of the motion, the user might miss to immediately track the motion of the ROI and adjust the orientation of the electronic device (10) due to a slower user response. Further, the electronic device (10) captures the object (40) partially or completely misses to capture the object (40) in the subsequent image frames (60). When the user needs to track the moving object (40) on higher zoom levels, it is even more difficult to manually track the moving object (40) due to random movements of the object (40) and/or the electronic device (10). Thus, it is desired to provide a useful alternative for automatically tracking the ROI in the image frames.

SUMMARY

Embodiments of the disclosure provide a method and an electronic device for tracking an ROI in image frames using an electronic device. The electronic device monitors a size factor of each image frame received from one or more cameras. In response to detecting a change in the size factor from a consecutive image frame with reference to a preceding image frame, the electronic device identifies that ROI is moving outside from each consecutive image frame. Further, the electronic device estimates a correction in zoom and a tilt required for the one or more cameras of the electronic device to track the ROI. Upon correcting the zoom and tilting the one or more cameras, the electronic device accurately tracks the ROI even the electronic device is moving or/and the ROI is moving or/and the electronic device is zooming in/out.

Embodiments of the disclosure may operate an actuator of the one or more cameras of the electronic device for maintaining the ROI within consecutive image frames of a video, or the ROI at a specific position within the consecutive image frames of the video. Thus, the disclosure ensures keeping the ROI within the consecutive image frames of the video even the electronic device is moving or/and the ROI is moving or/and the electronic device is zooming in/out, which improves a video capturing experience of a user.

Embodiments of the disclosure facilitate smooth camera transition in case of multi-camera scenarios. The electronic device operates the actuator of a secondary camera (e.g. wide angle camera) similar to the operation on the actuator of a primary operating camera (e.g. normal angle camera), such that a center of the image frames capturing by both the cameras will be relatively same. Therefore, no ROI shift will experience while switching between the primary camera and the secondary camera.

Accordingly, various example embodiments herein provide a method for tracking a ROI in image frames using an electronic device. The method includes: receiving, by the electronic device, the image frames from one or more cameras of the electronic device; identifying, by the electronic device, the region of interest (ROI) in the image frames to be tracked; determining, by the electronic device, a distance of the ROI from each edge of the image frames; recognizing, by the electronic device, that the ROI is moving away from a position in the image frames based on the distance of the ROI from each edge of the image frames; automatically operating, by the electronic device, an actuator of the one or more cameras to vary the distance of the ROI from each edge of the image frames for maintaining the position of the ROI in the image frames.

In an example embodiment, wherein recognizing, by the electronic device, that the ROI is moving away from the position in the image frames based on the distance of the ROI from each edge of the image frames, comprises: determining, by the electronic device, a size factor of the ROI in the image frames based on the distance of the ROI from each edge of the image frames, wherein the size factor is a ratio of the distance of the ROI from vertical edges of an image frame or a ratio of the distance of the ROI from horizontal edges of the image frame, detecting, by the electronic device, a difference in the size factor of the ROI in the image frames, and recognizing, by the electronic device, that the ROI is moving away from the position in the image frames, in response to detecting the difference in the size factor of the ROI in the image frames.

In an example embodiment, wherein recognizing, by the electronic device, that the ROI is moving away from the position in the image frames, in response to detecting the difference in the size factor of the ROI in the image frames, comprises: determining, by the electronic device, whether the difference between the size factor of the ROI in the image frames matches a threshold condition, and identifying, by the electronic device, that the ROI is moving away from the position in the image frames, in response to determining that the difference between the size factor of the ROI in the image frames matches the threshold condition.

In an example embodiment, wherein automatically operating, by the electronic device, the actuator of the one or more cameras to vary the distance of the ROI from each edge of the image frames for maintaining the position of the ROI in the image frames, comprises: determining, by the electronic device, a relative speed of the ROI while moving away from the position in the image frames based on the distance of the ROI from each edge of the image frames, identifying, by the electronic device, a specific position of the ROI to be maintained in the image frame based on a history of a movement of the electronic device or receiving an input, determining, by the electronic device, a current position of the actuator and a time required for each micromotion of the actuator, wherein a motion of the actuator changes an orientation of the one or more cameras or a lens of the one or more cameras, estimating, by the electronic device, a target position of the actuator to reach from the current position for maintaining the specific position of the ROI in the image frames based on the current position of the actuator, the time required for each micromotion of the actuator, position coordinates of the specific location of the ROI, and the relative speed of the ROI, and changing, by the electronic device, the current position of the actuator to the target position.

In an example embodiment, wherein automatically operating, by the electronic device, the actuator of the one or more cameras to vary the distance of the ROI from each edge of the image frames for maintaining the position of the ROI in the image frames, further comprises: receiving, by the electronic device, a target zoom factor, wherein the target zoom factor is an amount of zoom needed for the image frames, Further, the method includes: estimating, by the electronic device, a rate of change of the zoom to be applied on the image frames based on the target zoom factor, the position coordinates of the specific location of the ROI, and the relative speed of the ROI between the image frames, and a speed of the actuator to maintain the specific position of the ROI in the image frame, and zooming, by the electronic device, the image frames based on the estimated rate of change of the zoom.

Accordingly, various example embodiments provide an electronic device for tracking a region of interest (ROI) in image frames. The electronic device including: a ROI tracking engine, a memory, a processor, wherein the ROI tracking engine is coupled to the memory and the processor. The ROI tracking engine is configured to: receive the image frames from the one or more cameras; identify the ROI in the image frames to be tracked; determine a distance of the ROI from each edge of the image frames; recognize that the ROI is moving away from the position in the image frames based on the distance of the ROI from each edge of the image frames; automatically operate the actuator of the one or more cameras to vary the distance of the ROI from each edge of the image frames to maintain the position of the ROI in the image frames.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure, and the embodiments herein include all such modifications.

BRIEF DESCRIPTION OF THE DRAWINGS

This method and electronic device are illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which.

DETAILED DESCRIPTION

The various example embodiments herein and the various features and advantageous details thereof are explained more fully with reference to the non-limiting example embodiments that are illustrated in the accompanying drawings and described in greater detail in the following description. Descriptions of well-known components and processing techniques may be omitted so as to not unnecessarily obscure the disclosure. The various embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced. Accordingly, the examples should not be construed as limiting the scope of the disclosure.

As is traditional in the field, embodiments may be described and illustrated in terms of blocks which carry out a described function or functions. These blocks, which may be referred to herein as managers, units, modules, hardware components or the like, may be physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings provided to aid in understanding various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, primary, secondary, etc. may be used herein to describe various elements, these elements should not be limited by these terms. These terms are generally only used to distinguish one element from another.

Accordingly, the various example embodiments herein provide a method for tracking a ROI in image frames using an electronic device. The method includes: receiving, by the electronic device, the image frames from one or more cameras of the electronic device; identifying, by the electronic device, the ROI in the image frames to be tracked; determining, by the electronic device, a distance of the ROI from each edge of the image frames; recognizing, by the electronic device, that the ROI is moving away from a position in the image frames based on the distance of the ROI from each edge of the image frames; and automatically operating, by the electronic device, an actuator of the one or more cameras to vary the distance of the ROI from each edge of the image frames for maintaining the position of the ROI in the image frames.

Accordingly, various example embodiments herein provide an electronic device for tracking the ROI in the image frames. The electronic device includes: a ROI tracking engine, a memory, a processor, wherein the ROI tracking engine is coupled to the memory and the processor. The ROI tracking engine is configured to: receive the image frames from the one or more cameras; identify the ROI in the image frames to be tracked; determine the distance of the ROI from each edge of the image frames; recognize that the ROI is moving away from the position in the image frames based on the distance of the ROI from each edge of the image frames; and automatically operate the actuator of the one or more cameras to vary the distance of the ROI from each edge of the image frames for maintaining the position of the ROI in the image frames.

Unlike existing methods and systems, the electronic device monitors a size factor of each image frame received from the one or more cameras. In response to detecting a change in the size factor from a consecutive image frame with reference to a preceding image frame, the electronic device identifies that ROI is moving outside from each consecutive image frames. Further, the electronic device estimates a correction in zoom and a tilt required for the one or more cameras of the electronic device to track the ROI. Upon correcting the zoom and tilting the one or more cameras, the electronic device accurately tracks the ROI even the electronic device is moving or/and an object inside the ROI is moving or/and the electronic device is zooming in/out.

Unlike existing methods and systems, the electronic device operates the actuator of the one or more cameras of the electronic device for maintaining the ROI within consecutive image frames of a video or the ROI at a specific position within the consecutive image frames of the video. Thus, the disclosed method ensures to keep the ROI within the consecutive image frames of the video even the electronic device is moving or/and an object inside the ROI is moving or/and the electronic device is zooming in/out, which improves a video capturing experience of a user.

Unlike existing methods and systems, the electronic device facilitates smooth camera transition in case of multi-camera scenarios. The electronic device operates the actuator of a secondary camera (e.g. wide angle camera) similar to the operation on the actuator of a primary operating camera (e.g. normal angle camera), such that a center of the image frames capturing by both the cameras will be relatively same. Therefore, no ROI shift will experience while switching between the primary camera and the secondary camera.

Referring now to the drawings, and more particularly to FIGS. 2 through 8, there are shown various example embodiments.

Figure 2:
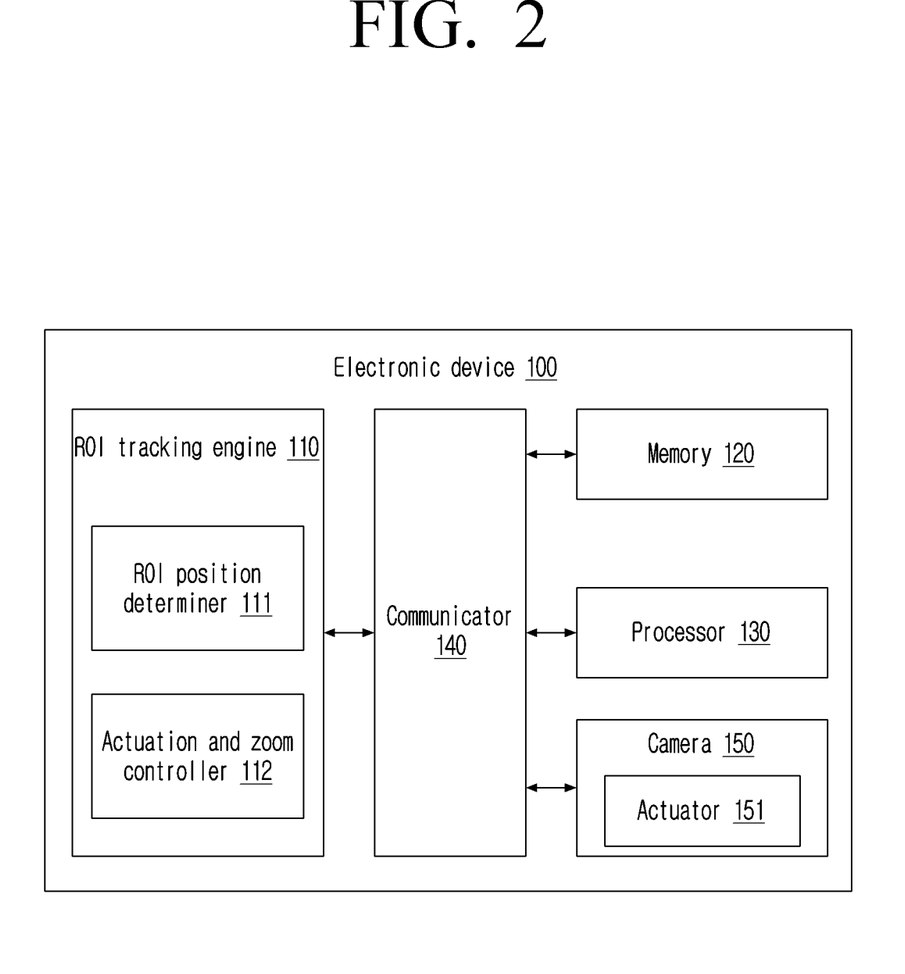
FIG. 2 is a block diagram illustrating an example configuration of an electronic device for tracking an ROI in the image frames, according to various embodiments.

FIG. 2 is a block diagram illustrating an example configuration of an electronic device (100) for tracking a ROI in the image frames, according to various embodiments. Examples of the electronic device (100) include, but are not limited to a smartphone, a tablet computer, a personal digital assistance (PDA), a desktop computer, an Internet of Things (IoT), etc. In an embodiment, the electronic device (100) includes a ROI tracking engine (e.g., including various processing circuitry and/or executable program instructions) (110), a memory (120), a processor (e.g., including processing circuitry) (130), a communicator (e.g., including communication circuitry) (140), and one or more cameras (150). In an embodiment, the camera(s) (150) includes an actuator (151), and optical components such as, but not limited to, one or more lenses, one or more camera sensors, etc., where the actuator (151) is mechanically coupled to the one or more optical components to make a motion on the one or more optical components or over the camera(s) (150) itself. Tilt actuator is an example of the actuator (151). In an embodiment, the ROI tracking engine (110) includes a ROI position determiner (e.g., including various processing circuitry and/or executable program instructions) (111) and an actuation and zoom controller (e.g., including various processing circuitry and/or executable program instructions) (112).

The ROI tracking engine (110), the ROI position determiner (111), and the actuation and zoom controller (112) may be implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

Figure 5:
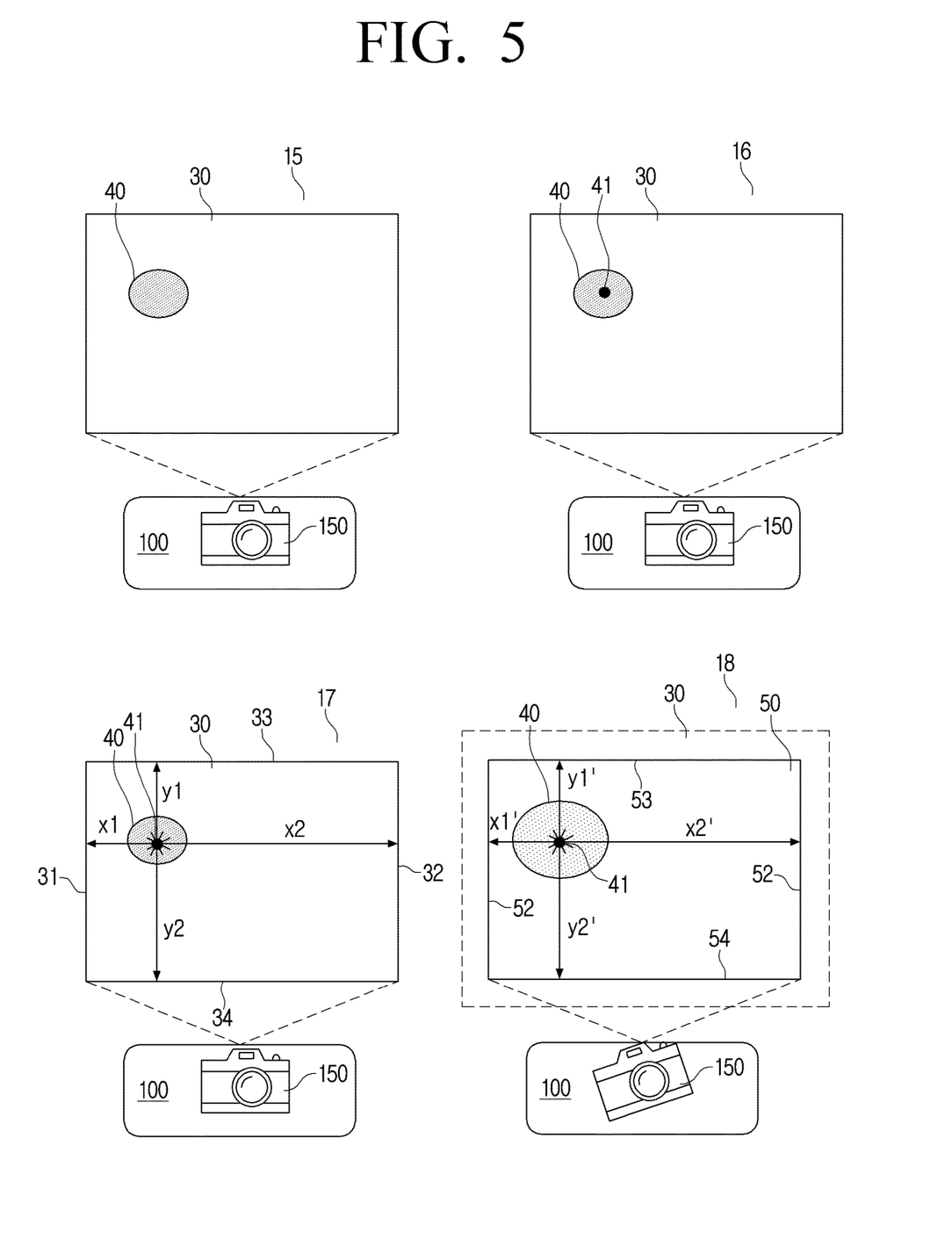
FIG. 5 is a diagram illustrating an example scenario of tracking the position of the ROI in the image frames by the electronic device including one camera, according to various embodiments.
Figure 6:
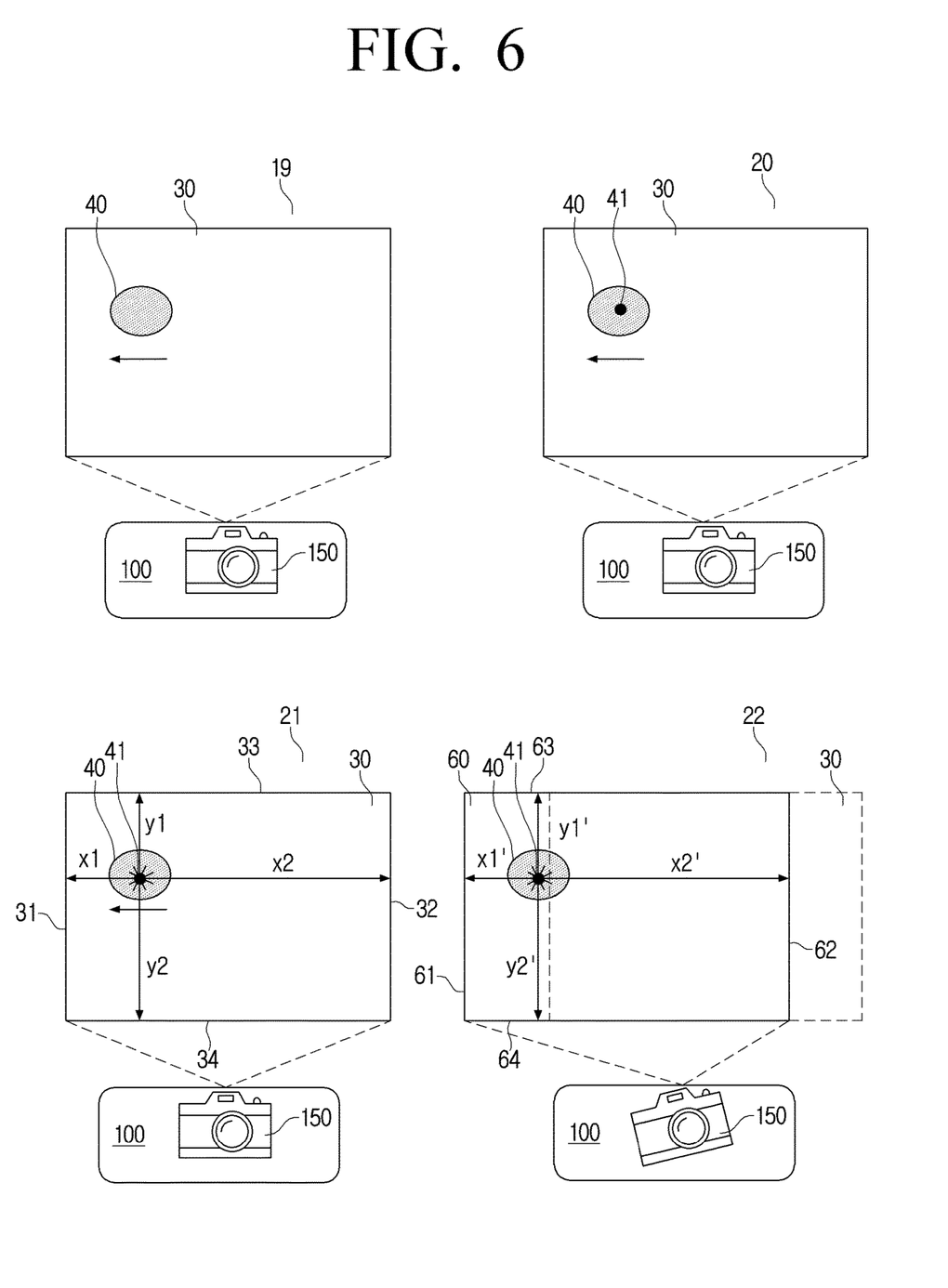
FIG. 6 is a diagram illustrating an example scenario of tracking the position of the ROI in the image frames by the electronic device including one camera, according to various embodiments.

The ROI tracking engine (110) receives the image frames from the camera(s) (150). The ROI tracking engine (110) identifies the ROI in the image frames to be tracked. The ROI tracking engine (110) determines a distance of the ROI from each edge of the image frames. The ROI tracking engine (110) recognizes that the ROI is moving away from a position in the image frames based on the distance of the ROI from each edge of the image frames. In an embodiment, the ROI tracking engine (110) determines a size factor of the ROI in the image frames based on the distance of the ROI from each edge of the image frames. With reference to FIGS. 5 and 6, in an embodiment, the size factor may refer, for example, to a ratio of the distance of an arbitrary point of the ROI from vertical edges of an image frame (33), e.g., x1/x2, where x1 is the distance of the ROI from a left vertical edge (31) of the image frame (30), and x2 is the distance of the ROI from a right vertical edge (32) of the image frame (30). The arbitrary point of ROI may, for example, be a centroid/center of the ROI or a center of a bounding box surrounded the ROI.

In an embodiment, the size factor may refer, for example, to a ratio of the distance of the arbitrary point of the ROI from horizontal edges of the image frame (33), e.g., y1/y2, where y1 is the distance of the ROI from a top horizontal edge (33) of the image frame (30), and y2 is the distance of the ROI from a bottom horizontal edge (34) of the image frame (30). The ROI tracking engine (110) detects a difference in the size factor of the ROI in the image frames. Further, the ROI tracking engine (110) recognizes that the ROI is moving away from the position in the image frames, in response to detecting the difference in the size factor of the ROI in the image frames.

With reference to the FIGS. 5 and 6, x1/x2 may refer, for example, to the size factor of the image frame (30) determined from the vertical edges (31, 32) of the image frame (30), whereas y1/y2 may refer, for example, to the size factor of the first image frame determined from the horizontal edges (33, 34) of the image frame (30). In response to receiving a subsequent image frame, the ROI tracking engine (110) determines the size factor of the subsequent image frame. Consider, x1'/x2' and y1'/y2' are the size factors (e.g. 1.4, 0.3) of the subsequent image frame determined from the vertical edges and the horizontal edges of the subsequent image frame respectively. $\Delta x$ is the difference (error) between the size factor of the ROI in the image frames determine from the vertical edges of the image frames, e.g., $\Delta x=(x1/x2)-(x1'/x2')$. $\Delta y$ is the difference between the size factor of the ROI in the image frames determined from the horizontal edges of the image frames, e.g., $\Delta y=(y1/y2)-(y1'/y2')$.

In an embodiment, the ROI tracking engine (110) determines whether the difference between the size factor of the ROI in the image frames matches a threshold condition. Further, the ROI tracking engine (110) identifies that the ROI is moving away from the position in the image frames, in response to determining that the difference between the size factor of the ROI in the image frames matches the threshold condition. For example, the threshold condition is $\Delta x$ and/or $\Delta y$ is greater than or equal to 0.2. The ROI tracking engine (110) identifies that the ROI is moving away from the position in the image frames when the $\Delta x$ and/or $\Delta y$ is greater than or equal to 0.2.

The ROI tracking engine (110) automatically operates the actuator (151) of the camera(s) (150) to vary the distance of the ROI from each edge of the image frames to maintain the position of the ROI in the image frames. In an embodiment, the ROI tracking engine (110) determines the relative speed of the ROI while moving away from the position in the image frames based on the distance of the ROI from each edge of the image frames. Further, the ROI tracking engine (110) identifies a specific position of the ROI to be maintained in the image frame by understanding a history of (e.g., based on) a movement of the electronic device (100) or receiving a user input.

Further, the ROI tracking engine (110) determines a current position of the actuator (151) and a time required for each micromotion of the actuator (151), where a motion of the actuator (151) changes an orientation of the camera(s) (150) or/and the optical components. Further, the ROI tracking engine (110) estimates a target position of the actuator (151) to reach from the current position for maintaining the specific position of the ROI in the image frames based on the current position of the actuator (151), the time required for each micromotion of the actuator (151), position coordinates of the specific location of the ROI, and the relative speed of the ROI. Further, the ROI tracking engine (110) changes the current position of the actuator (151) to the target position.

In an embodiment, the ROI tracking engine (110) receives a target zoom factor from, for example, a user. The target zoom factor may refer, for example, to an amount of zoom needed for the user on the image frames. Further, the ROI tracking engine (110) estimates a rate of change of the zoom to be applied on the image frames based on the target zoom factor, the position coordinates of the specific location of the ROI, and the relative speed of the ROI between the image frames, and a speed of the actuator (151) to maintain the specific position of the ROI in the image frame. Further, the ROI tracking engine (110) zooms in the image frames based on the estimated rate of change of the zoom.

In an embodiment, the ROI tracking engine (110) receives the image frames (e.g., consecutive image frames) and device parameters of the electronic device (100) including a gyroscope value and an accelerometer value. Further, the ROI tracking engine (110) checks whether a movement of the electronic device (100) is present or not based on the device parameters. In response to detecting the movement of the electronic device (100) based on device parameters, the ROI tracking engine (110) applies an image translation between the image frames to negate the movement of the electronic device (100).

In an embodiment, the ROI position determiner (111) receives the image frames from the camera(s) (150). The ROI position determiner (111) identifies the ROI in the image frames to be tracked. The ROI position determiner (111) determines the distance of the ROI from each edge of the image frames. The ROI position determiner (111) recognizes that the ROI is moving away from the position in the image frames based on the distance of the ROI from each edge of the image frames. In an embodiment, the ROI position determiner (111) determines the size factor of the ROI in the image frames based on the distance of the ROI from each edge of the image frames. The ROI position determiner (111) detects the difference in the size factor of the ROI in the image frames. Further, the ROI position determiner (111) recognizes that the ROI is moving away from the position in the image frames, in response to detecting the difference in the size factor of the ROI in the image frames.

In an embodiment, the ROI position determiner (111) determines whether the difference between the size factor of the ROI in the image frames matches the threshold condition. Further, the ROI position determiner (111) identifies that the ROI is moving away from the position in the image frames, in response to determining that the difference between the size factor of the ROI in the image frames matches the threshold condition.

The actuation and zoom controller (112) automatically operates the actuator (151) of the camera(s) (150) to vary the distance of the ROI from each edge of the image frames for maintaining the position of the ROI in the image frames. In an embodiment, the actuation and zoom controller (112) determines the relative speed of the ROI while moving away from the position in the image frames based on the distance of the ROI from each edge of the image frames. Further, the actuation and zoom controller (112) identifies the specific position of the ROI to be maintained in the image frame by understanding the history of (e.g., based on) a movement of the electronic device (100) or receiving the user input.

Further, the actuation and zoom controller (112) determines the current position of the actuator (151) and the time required for each micromotion of the actuator (151). Further, the actuation and zoom controller (112) estimates the target position of the actuator (151) to reach from the current position for maintaining the specific position of the ROI in the image frames based on the current position of the actuator (151), the time required for each micromotion of the actuator (151), position coordinates of the specific location of the ROI, and the relative speed of the ROI. Further, the actuation and zoom controller (112) changes the current position of the actuator (151) to the target position.

In an embodiment, the actuation and zoom controller (112) receives the target zoom factor from a user. Further, the actuation and zoom controller (112) estimates the rate of change of the zoom to be applied on the image frames based on the target zoom factor, the position coordinates of the specific location of the ROI, and the relative speed of the ROI between the image frames, and a speed of the actuator (151) to maintain the specific position of the ROI in the image frame. Further, the actuation and zoom controller (112) zooms in the image frames based on the estimated rate of change of the zoom.

In an embodiment, the ROI position determiner (111) receives the image frames (e.g., consecutive image frames) and device parameters of the electronic device (100). Further, the ROI position determiner (111) checks whether the movement of the electronic device (100) is present or not based on the device parameters. In response to detecting the movement of the electronic device (100) based on device parameters, the ROI position determiner (111) applies the image translation between the image frames to negate the movement of the electronic device (100).

The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the electronic device (100), a cloud storage, or any other type of external storage.

The processor (130) may include various processing circuitry and may be configured to execute instructions stored in the memory (120). The processor (130) may include, for example, and without limitation, a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the electronic device (100). Further, the communicator (140) is configured to facilitate the communication between the electronic device (100) and other devices via one or more networks (e.g. Radio technology). The communicator (140) includes an electronic circuit specific to a standard that enables wired or wireless communication.

Although the FIG. 2 shows the hardware components of the electronic device (100) it is to be understood that other embodiments are not limited by the components illustrated in FIG. 2. In various embodiments, the electronic device (100) may include less or more number of components. Further, the labels or names of the components are used only for illustrative purpose and does not limit the scope of the disclosure. One or more components can be combined together to perform same or substantially similar function for tracking the ROI.

Figure 3:
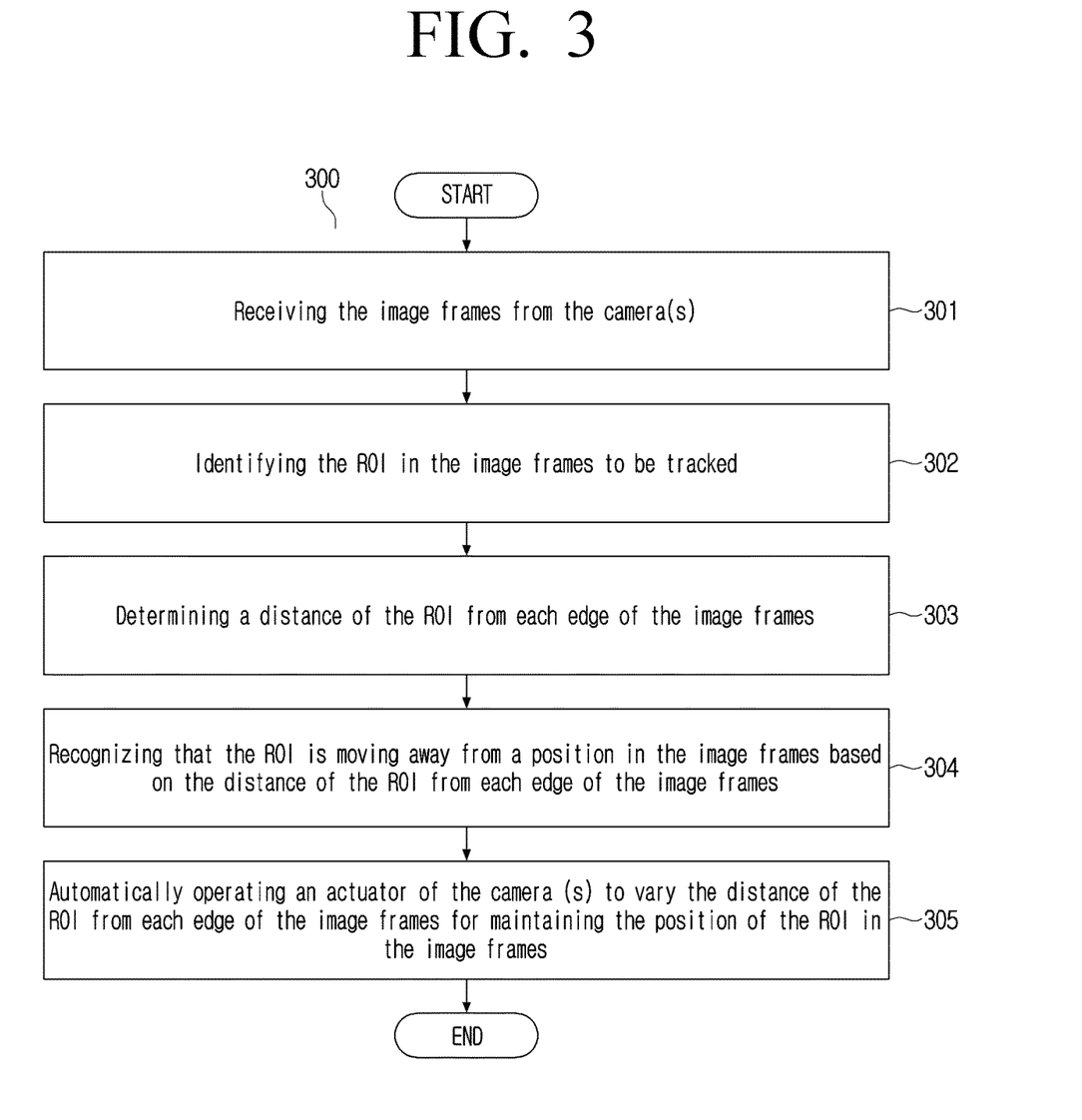
FIG. 3 is a flowchart illustrating an example method for tracking the ROI in the image frames by the electronic device, according to various embodiments.

FIG. 3 is a flowchart (300) illustrating an example method for tracking the ROI in the image frames by the electronic device (100), according to various embodiments. In an embodiment, the method allows the ROI tracking engine (110) to perform operations 301-305. At operation 301, the method includes receiving the image frames from the camera(s) (150). At operation 302, the method includes identifying the ROI in the image frames to be tracked. At operation 303, the method includes determining the distance of the ROI from each edge of the image frames. At operation 304, the method includes recognizing that the ROI is moving away from the position in the image frames based on the distance of the ROI from each edge of the image frames. At operation 305, the method includes automatically operating the actuator (151) of the camera(s) (150) to vary the distance of the ROI from each edge of the image frames for maintaining the position of the ROI in the image frames.

Figure 4A:
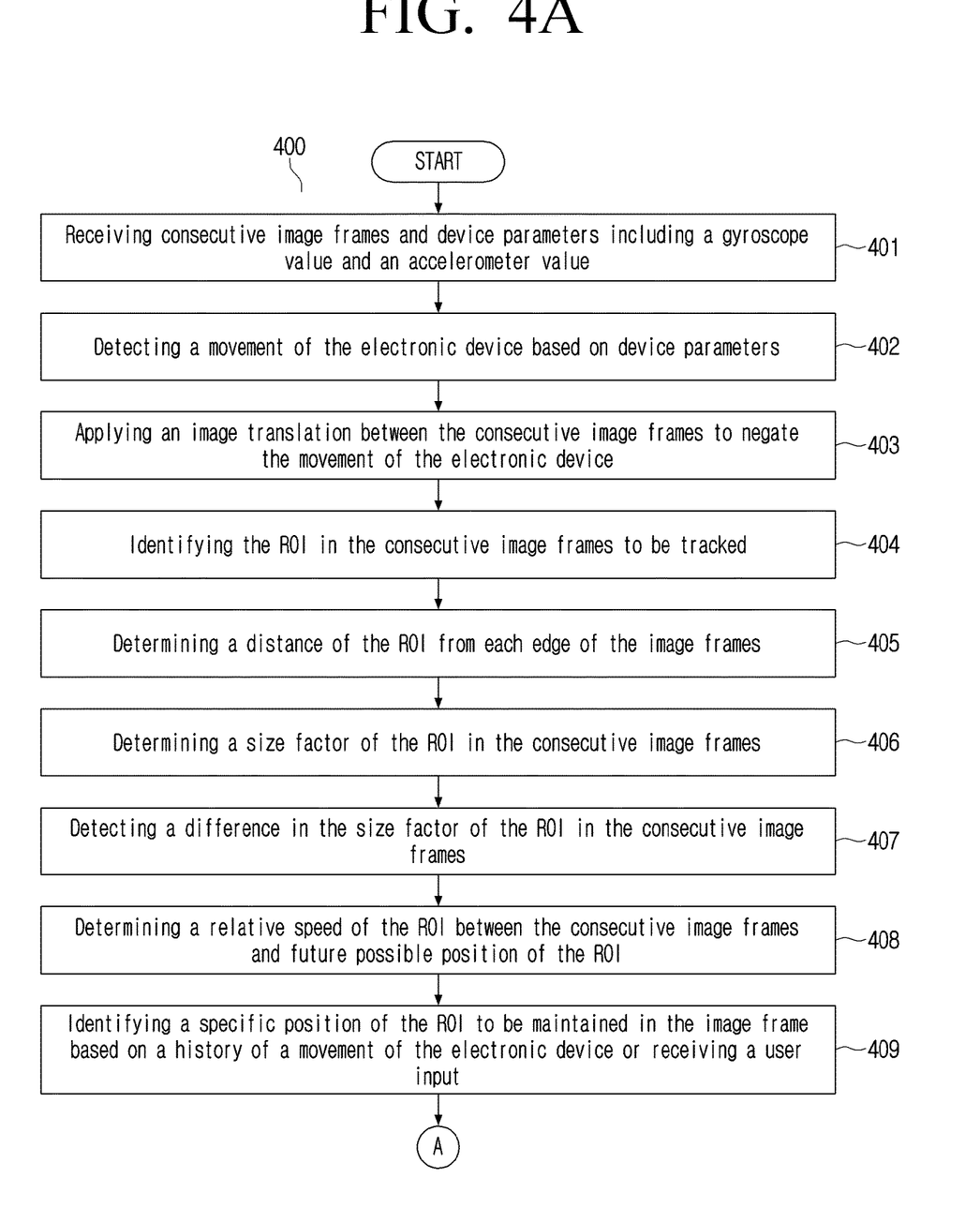
FIGS. 4A and 4B are flowcharts illustrating an example method for maintaining a position of the ROI in consecutive image frames, according to various embodiments.
Figure 4B:
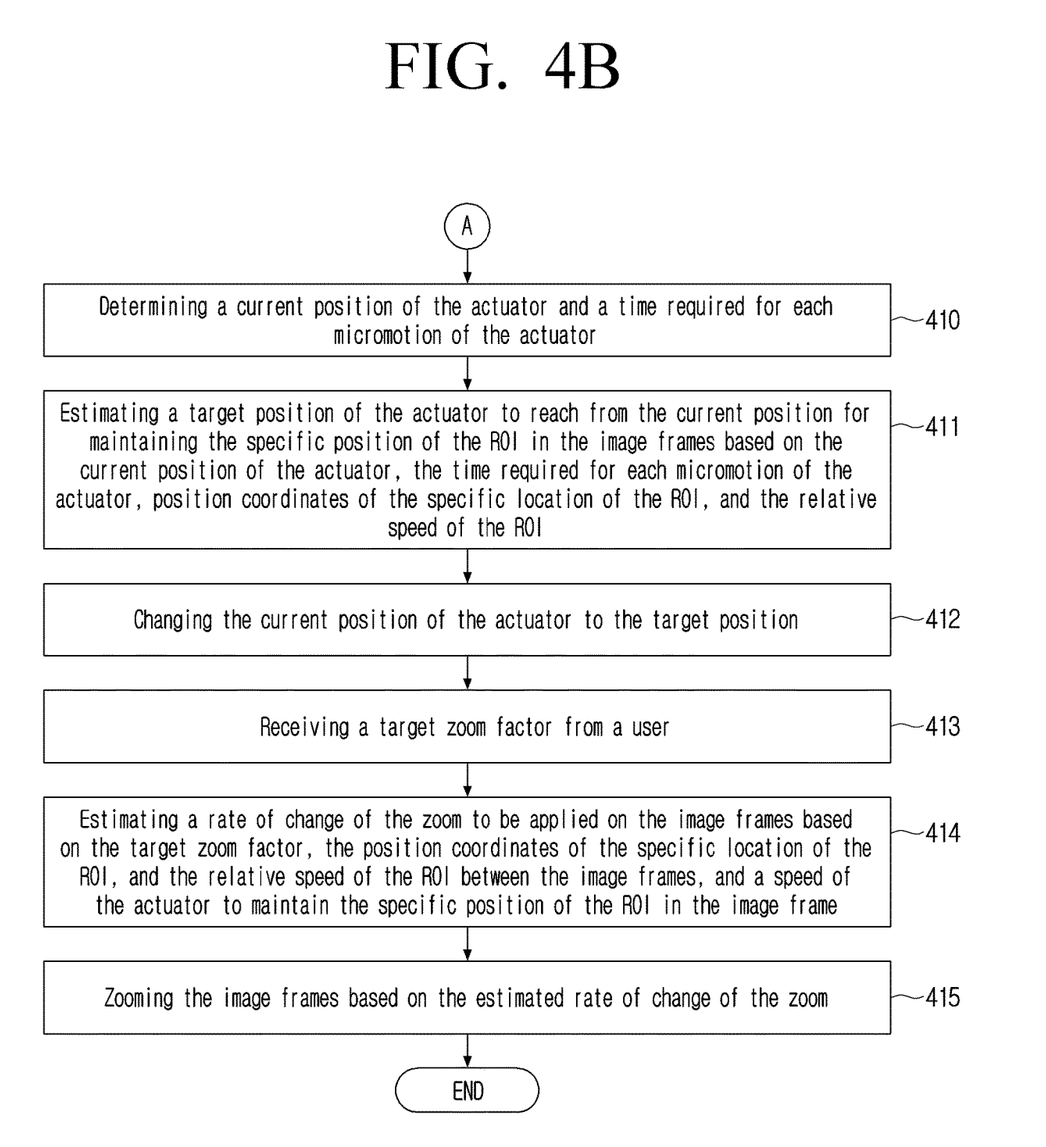

FIGS. 4A and 4B are flowcharts (400) illustrating an example method for maintaining the position of the ROI in consecutive image frames, according to various embodiments. In an embodiment, the method allows the ROI tracking engine to perform operations 401-415. At operation 401, the method includes receiving the consecutive image frames and the device parameters including the gyroscope value and the accelerometer value. At operation 402, the method includes detecting the movement of the electronic device (100) based on the device parameters. At operation 403, the method includes applying the image translation between the consecutive image frames to negate the movement of the electronic device (100). At operation 404, the method includes identifying the ROI in the consecutive image frames to be tracked. At operation 405, the method includes determining the distance of the ROI from each edge of the image frames. At operation 406, the method includes determining the size factor of the ROI in the consecutive image frames. At operation 407, the method includes detecting the difference in the size factor of the ROI in the consecutive image frames. At operation 408, the method includes determining the relative speed of the ROI between the consecutive image frames and future possible position of the ROI.

At operation 409, the method includes identifying the specific position of the ROI to be maintained in the image frame based on the history of the movement of the electronic device (100) or receiving the user input. At operation 410, the method includes determining the current position of the actuator (151) and the time required for each micromotion of the actuator (151). At operation 411, the method includes estimating the target position of the actuator (151) to reach from the current position for maintaining the specific position of the ROI in the image frames based on the current position of the actuator (151), the time required for each micromotion of the actuator (151), position coordinates of the specific location of the ROI, and the relative speed of the ROI. At operation 412, the method includes changing the current position of the actuator (151) to the target position. At step 413, the method includes receiving the target zoom factor from the user. At operation 414, the method includes estimating the rate of change of the zoom to be applied on the image frames based on the target zoom factor, the position coordinates of the specific location of the ROI, and the relative speed of the ROI between the image frames, and the speed of the actuator (151) to maintain the specific position of the ROI in the image frame. At operation 415, the method includes zooming the image frames based on the estimated rate of change of the zoom.

The various actions, acts, blocks, steps, or the like in the flowcharts (300, 400) may be performed in the order presented, in a different order or simultaneously. Further, in various embodiments, some of the actions, acts, blocks, steps, or the like may be omitted, added, modified, skipped, or the like without departing from the scope of the disclosure.

FIG. 5 is diagram illustrating an example scenario of tracking the position of the ROI in the image frames by the electronic device (100) including one camera (150), according to various embodiments. By way of non-limiting example, the electronic device (100) is capturing the images frames (30) of a scene using the camera (150) as shown in (15). The scene includes an object located at a corner of the scene, where the object is the ROI (40) in the images frames (30). Further, the electronic device (100) determines a center (41) of the ROI (40) as shown in (16). As shown in (17), the electronic device (100) determines the size factor (e.g., x1/x2 and y1/y2) of the ROI (40) in the image frames (30) based on the distance (x1) of the center (41) of the ROI (40) from the left vertical edge (31) of the image frames (30), the distance (x2) of the center (41) of the ROI (40) from the right vertical edge (32) of the image frames (30), the distance (y1) of the center (41) of the ROI (40) from the top horizontal edge (33) of the image frames (30) and the distance (y2) of the center (41) of the ROI (40) from the bottom horizontal edge (34) of the image frames (30).

As shown in (18), when the user zooms the scene using the camera (150) of the electronic device (100), the electronic device (100) determines the size factor (e.g., x1'/x2' and y1'/y2') of the ROI (40) in the subsequent image frames (50) based on the distance (x1') of the center (41) of the ROI (40) from the left vertical edge (51) of the subsequent image frames (50), the distance (x2') of the center (41) of the ROI (40) from the right vertical edge (52) of the subsequent image frames (50), the distance (y1') of the center (41) of the ROI (40) from the top horizontal edge (53) of the subsequent image frames (50) and the distance (y2') of the center (41) of the ROI (40) from the bottom horizontal edge (54) of the subsequent image frames (50). Further, the electronic device (100) checks for the difference in the size factor (e.g., Δx and Δy) of the ROI (40) in the image frames (30) and the subsequent image frames (50). In response to determining the difference in the size factor, the electronic device (100) automatically triggers the actuator (151) of the camera (150) for maintaining the position of the ROI (40) in the subsequent image frames (50). Further, the actuator (151) changes the orientation of the camera (150) or the optical components of the camera (150) to nullify the difference in the size factor of the ROI (40) in the image frames (30) and the subsequent image frames (50).

FIG. 6 is a diagram illustrating an example scenario of tracking the position of the ROI in the image frames by the electronic device (100) including one camera (150), according to various embodiments. By way of non-limiting example, the electronic device (100) is capturing the images frames (30) of the scene using the camera (150) as shown in (19). The scene includes the object located at the corner of the scene and linearly moving away from the scene, where the object is the ROI (40) in the images frames (30). The electronic device (100) determines the center (41) of the ROI (40) as shown in (20). As shown in (21), the electronic device (100) determines the size factor (e.g., x1/x2 and y1/y2) of the ROI (40) in the image frames (30) based on the distance (x1) of the center (41) of the ROI (40) from the left vertical edge (31) of the image frames (30), the distance (x2) of the center (41) of the ROI (40) from the right vertical edge (32) of the image frames (30), the distance (y1) of the center (41) of the ROI (40) from the top horizontal edge (33) of the image frames (30) and the distance (y2) of the center (41) of the ROI (40) from the bottom horizontal edge (34) of the image frames (30).

As shown in (22), the electronic device (100) determines the size factor (e.g., x1'/x2' and y1'/y2') of the ROI (40) in subsequent image frames (60) based on the distance (x1') of the center (41) of the ROI (40) from the left vertical edge (61) of the subsequent image frames (61), the distance (x2') of the center (41) of the ROI (40) from the right vertical edge (62) of the subsequent image frames (60), the distance (y1') of the center (41) of the ROI (40) from the top horizontal edge (63) of the subsequent image frames (60) and the distance (y2') of the center (41) of the ROI (40) from the bottom horizontal edge (64) of the subsequent image frames (60). Further, the electronic device (100) checks for the difference in the size factor (e.g., Δx and Δy) of the ROI (40) in the image frames (30) and the subsequent image frames (60). In response to determining the difference in the size factor, the electronic device (100) automatically triggers the actuator (151) of the camera (150) for maintaining the position of the ROI (40) in the subsequent image frames (60). Further, the actuator (151) changes the orientation of the camera (150) or the optical components of the camera (150) to nullify the difference in the size factor of the ROI (40) in the image frames (30) and the subsequent image frames (60).

Figure 7:
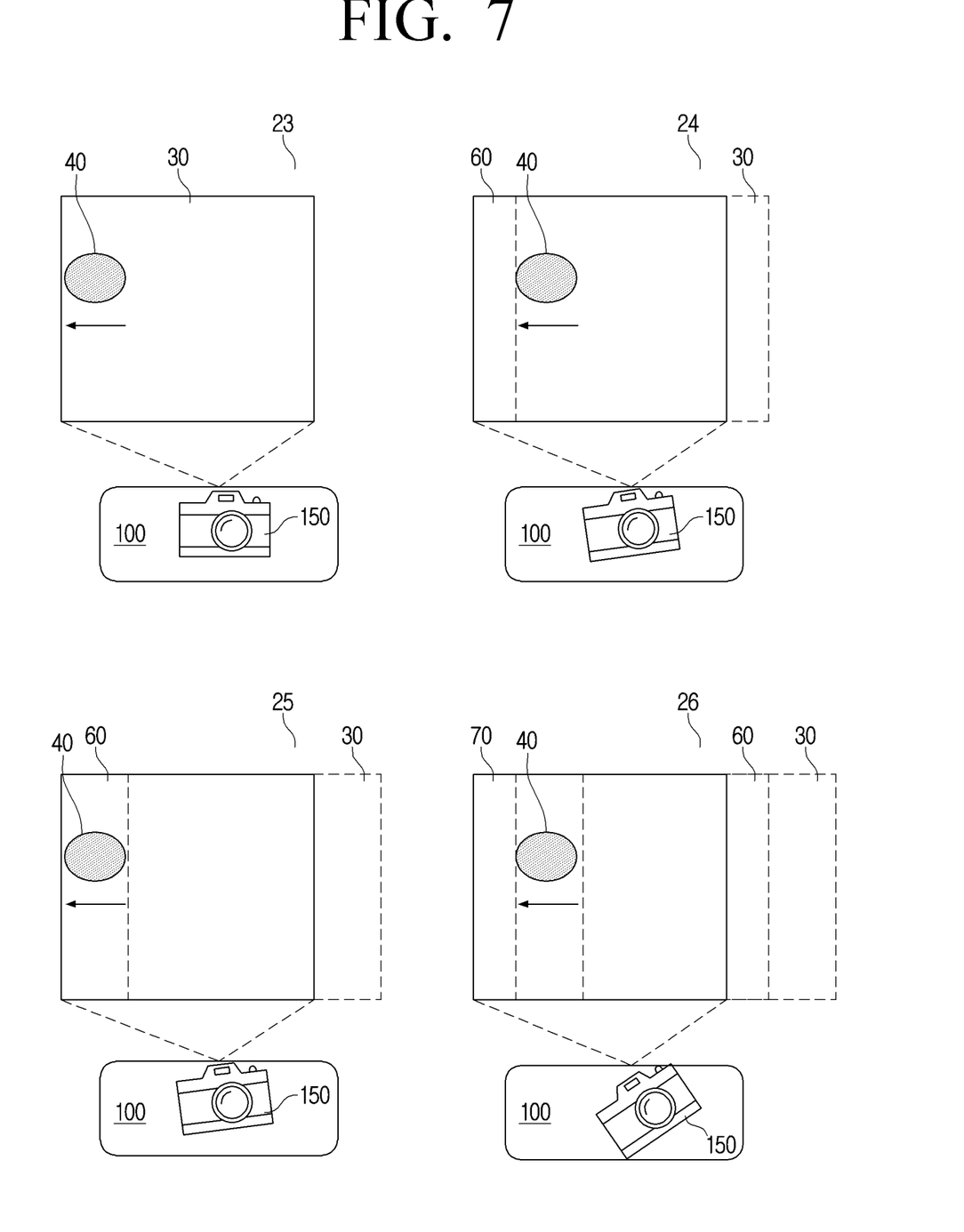
FIG. 7 is a diagram illustrating an example scenario of tracking the position of the ROI in the image frames by the electronic device including one camera, according to various embodiments.

FIG. 7 is a diagram illustrating an example scenario of tracking the position of the ROI in the image frames by the electronic device (100) including one camera (150), according to various embodiments. By way of non-limiting example, the electronic device (100) is capturing the images frames (30) of the scene using the camera (150) as shown in (23). The scene includes the object located at the corner of the scene and linearly moving away from the scene, where the object is the ROI (40) in the images frames (30). The electronic device (100) determines that the ROI (40) is moving away from the images frames (30). As shown in (24), the electronic device (100) automatically triggers the actuator (151) of the camera (150) for maintaining the position of the ROI (40) in a first subsequent image frame (60). Further, the actuator (151) changes the orientation of the camera (150) to 15 degrees for capturing the ROI (40) in the first subsequent image frame (60). As shown in (25), the electronic device (100) determines that the ROI (40) is moving away from the first subsequent image frame (60). As shown in (26), the electronic device (100) automatically triggers the actuator (151) of the camera (150) for maintaining the position of the ROI (40) in a second subsequent image frame (70). Further, the actuator (151) changes the orientation of the camera (150) from 15 degrees to 30 degrees for capturing the ROI (40) in the second subsequent image frame (70).

Unlike existing methods and systems, the electronic device (100) operates the actuator (151) of the camera (150) for maintaining the ROI within the consecutive image frames of a video or the ROI at a specific position within the consecutive image frames of the video. Thus, the disclosed method ensures to keep the ROI within the consecutive image frames of the video even the electronic device (100) is moving or/and the object inside the ROI (40) is moving or/and the electronic device (100) is zooming in/out, which improves a video capturing experience of a user.

Figure 8:
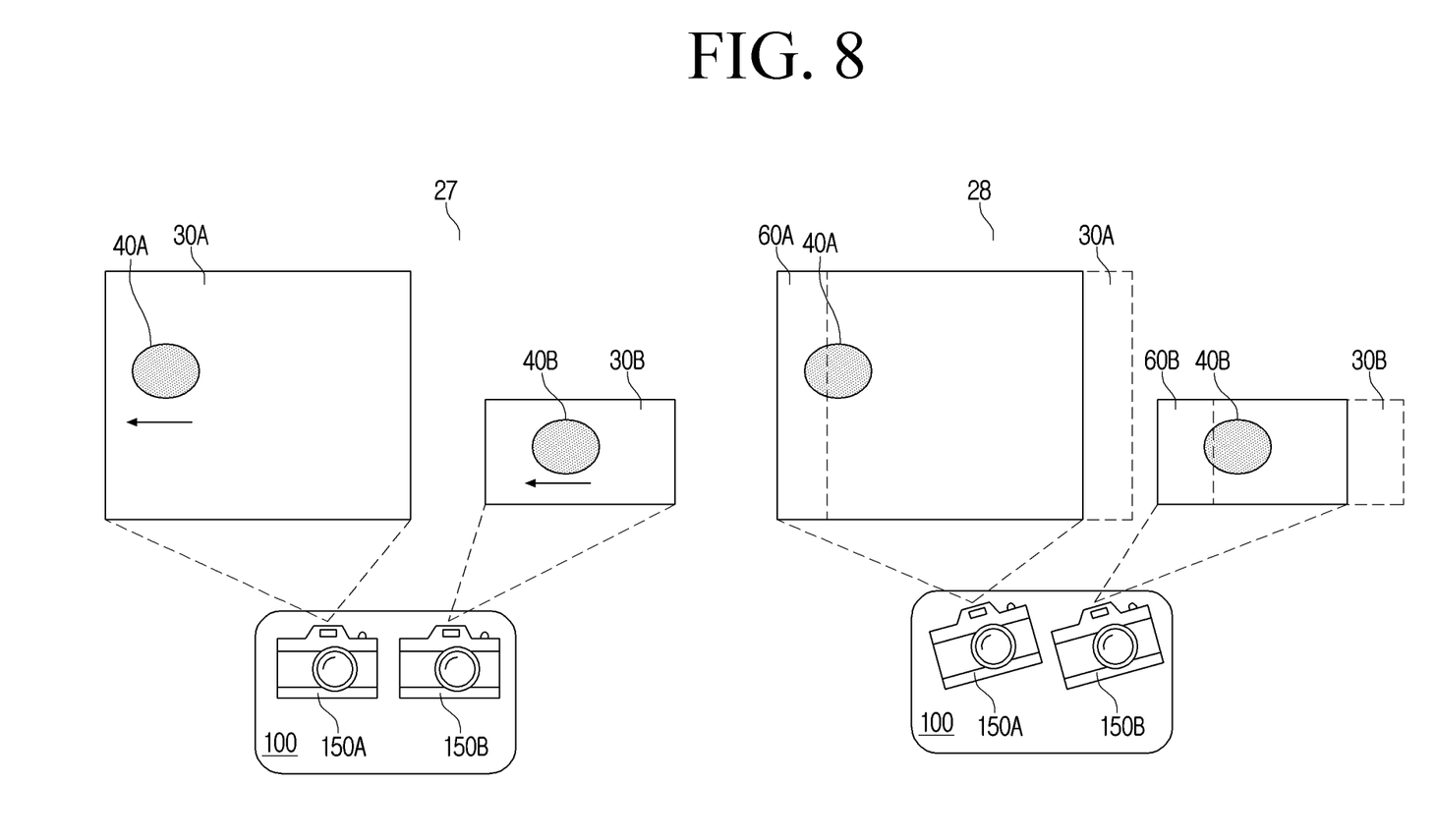
FIG. 8 is a diagram illustrating an example scenario of tracking the position of the ROI in the image frames by the electronic device including two cameras, according to various embodiments.

FIG. 8 is a diagram illustrating an example scenario of tracking the position of the ROI in the image frames by the electronic device (100) including two cameras (150A, 150B), according to various embodiments. By way of non-limiting example, the electronic device (100) is capturing the images frames (30A) of the scene using a camera (150A), where the electronic device (100) includes the two cameras (150A, 150B) of different Field of Views (FOVs) with relatively a common center at the FOVs and as shown in (27). The scene includes the object located at the corner of the scene and linearly moving away from the scene. The object is the ROI (40A) in the images frames (30A) generated by the camera (150A), whereas the object is the ROI (40B) in the images frames (30B) generated by the camera (150B).

The electronic device (100) determines that the ROI (40A) is moving away from the images frames (30A). As shown in (28), the electronic device (100) automatically triggers the actuator (151) of the cameras (150A, 150B) for maintaining the relative position of the ROI (40) same in the subsequent image frames (60A, 60B) generating by the cameras (150A, 150B). Further, the actuator (151) changes the orientation of the cameras (150A, 150B). Consider, the user inputs to the electronic device (100) for switching the cameras (150A, 150B). Further, the electronic device (100) switches capturing of the image frames (60A, 60B) from the camera (150A) to the camera (150B). Unlike existing methods and systems, the electronic device (100) facilitates smooth jitter free camera transition from the camera (150A) to the camera (150B), such that the center of the subsequent image frames (60A, 60B) capturing by both the cameras (150A, 150B) will be relatively same. Therefore, no ROI shift will experience by the user while switching between the cameras (150A, 150B) for recording/previewing the scene.

The foregoing description of the various example embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the various example embodiments herein have been described in terms of various example embodiments, those skilled in the art will recognize that the embodiments herein can be practiced with modification within the scope of the embodiments as described herein.

What is claimed is:

1. A method for tracking a Region of Interest (ROI) in image frames using an electronic device comprising at least one camera including one or more optical components and a tilt actuator which is mechanically coupled to the one or more optical components, the method comprising:
    receiving, by the electronic device, image frames from the at least one camera of the electronic device, wherein the image frames are consecutive image frames;
    identifying, by the electronic device, an ROI including a moving object in the image frames to be tracked;
    determining, by the electronic device, a distance of a center of the ROI from each edge of the image frames;
    recognizing, by the electronic device, that the ROI is moving away from a specific position in the image frames based on the distance of the ROI from each edge of the image frames; and
    based on recognizing that the ROI is moving away from the specific position in the image frames, automatically operating, by the electronic device, the tilt actuator of the at least one camera to vary the distance of the ROI from each edge of the image frames to maintain the specific position of the ROI in the image frames,
    wherein the each edge includes a left vertical edge, a right vertical edge, a top horizontal edge, bottom horizontal edge, and
    wherein recognizing, by the electronic device, that the ROI is moving away from the specific position in the image frames based on the distance of the ROI from each edge of the image frames, comprises:
        obtaining, by the electronic device, a first distance of the center of the ROI from the left vertical edge,
        obtaining, by the electronic device, a second distance of the center of the ROI from right vertical edge,
        obtaining, by the electronic device, a first ratio between the first distance and the second distance,
        obtaining, by the electronic device, a third distance of the center of the ROI from the top horizontal edge,
        obtaining, by the electronic device, a fourth distance of the center of the ROI from bottom horizontal edge,
        obtaining, by the electronic device, a second ratio between the third distance and the fourth distance,
        determining, by the electronic device, a size factor of the ROI in the image frames including the first ratio and the second ratio,
        detecting, by the electronic device, a difference in the size factor of the ROI in the image frames;
        determining, by the electronic device, whether the difference between the size factor of the ROI in the image frames matches a threshold condition; and
        recognizing, by the electronic device, that the ROI is moving away from the specific position in the image frames, in response to determining that the difference between the size factor of the ROI in the image frames matches the threshold condition.

2. The method as claimed in claim 1, wherein automatically operating, by the electronic device, the tilt actuator of the at least one camera to vary the distance of the ROI from each edge of the image frames to maintain the specific position of the ROI in the image frames, comprises:

determining, by the electronic device, a relative speed of the ROI while moving away from the specific position in the image frames based on the distance of the ROI from each edge of the image frames;

determining, by the electronic device, a current position of the tilt actuator, wherein a motion of the tilt actuator changes an orientation of the at least one camera or a lens of the at least one camera;

estimating, by the electronic device, a target position of the tilt actuator to reach from the current position for maintaining the specific position of the ROI in the image frames based on the current position of the tilt actuator, a time required for each micromotion of the tilt actuator, position coordinates of the specific position of the ROI, and the relative speed of the ROI; and changing, by the electronic device, the current position of the tilt actuator to the target position.

3. The method as claimed in claim 2, wherein the method further comprises:

receiving, by the electronic device, a target zoom factor, wherein the target zoom factor is an amount of zoom for the image frames;

estimating, by the electronic device, a rate of change of the zoom to be applied on the image frames based on the target zoom factor, the position coordinates of the specific position of the ROI, and the relative speed of the ROI between the image frames, and a speed of the tilt actuator to maintain the specific position of the ROI in the image frame; and zooming, by the electronic device, the image frames based on the estimated rate of change of the zoom.

4. An electronic device configured to track a Region of Interest (ROI) in image frames, comprising:

memory;

a processor comprising processing circuitry;

at least one camera including one or more optical components and a tilt actuator which is mechanically coupled to the one or more optical components; and a ROI tracking engine, coupled to the memory and the processor, configured to:

receive image frames from the at least one camera, wherein the image frames are consecutive image frames, identify an ROI in the image frames to be tracked, determine a distance of the ROI including a moving object from each edge of the image frames, recognize that the ROI is moving away from a specific position in the image frames based on the distance of a center of the ROI from each edge of the image frames, and based on recognizing that the ROI is moving away from the specific position in the image frames, automatically operate the tilt actuator of the at least one camera to vary the distance of the ROI from each edge of the image frames to maintain the specific position of the ROI in the image frames, wherein the each edge includes a left vertical edge, a right vertical edge, a top horizontal edge, bottom horizontal edge, and wherein recognizing, by the electronic device, that the ROI is moving away from the specific position in the image frames based on the distance of the ROI from each edge of the image frames, comprises:

obtaining, by the electronic device, a first distance of the center of the ROI from the left vertical edge, obtaining, by the electronic device, a second distance of the center of the ROI from right vertical edge, obtaining, by the electronic device, a first ratio between the first distance and the second distance, obtaining, by the electronic device, a third distance of the center of the ROI from the top horizontal edge, obtaining, by the electronic device, a fourth distance of the center of the ROI from bottom horizontal edge, obtaining, by the electronic device, a second ratio between the third distance and the fourth distance, determining, by the electronic device, a size factor of the ROI in the image frames including the first ratio and the second ratio, detecting, by the electronic device, a difference in the size factor of the ROI in the image frames;

determining, by the electronic device, whether the difference between the size factor of the ROI in the image frames matches a threshold condition; and recognizing, by the electronic device, that the ROI is moving away from the specific position in the image frames, in response to determining that the difference between the size factor of the ROI in the image frames matches the threshold condition.

5. The electronic device as claimed in claim 4, wherein automatically operating the tilt actuator of the at least one camera to vary the distance of the ROI from each edge of the image frames to maintain the specific position of the ROI in the image frames, comprises:

determining a relative speed of the ROI while moving away from the specific position in the image frames based on the distance of the ROI from each edge of the image frames;

determining a current position of the tilt actuator, wherein a motion of the tilt actuator changes an orientation of the at least one camera or a lens of the at least one camera;

estimating a target position of the tilt actuator to reach from the current position for maintaining the specific position of the ROI in the image frames based on the current position of the tilt actuator, a time required for each micromotion of the tilt actuator, position coordinates of the specific position of the ROI, and the relative speed of the ROI; and changing the current position of the tilt actuator to the target position.

6. The electronic device as claimed in claim 5, wherein automatically operating the tilt actuator of the at least one camera to vary the distance of the ROI from each edge of the image frames to maintain the position of the ROI in the image frames, comprises:

receiving a target zoom factor, wherein the target zoom factor is an amount of zoom for the image frames;

estimating a rate of change of the zoom to be applied on the image frames based on the target zoom factor, the position coordinates of the specific position of the ROI, and the relative speed of the ROI between the image frames, and a speed of the tilt actuator to maintain the specific position of the ROI in the image frames; and zooming the image frames based on the estimated rate of change of the zoom.

* * * * *